US011200735B2

(12) United States Patent
James et al.

(10) Patent No.: US 11,200,735 B2
(45) Date of Patent: Dec. 14, 2021

(54) APPARATUS AND METHOD FOR DEFINING AND INTERACTING WITH REGIONS OF AN OPERATIONAL AREA (71) Applicant: BAE Systems plc, London (GB)

(72) Inventors: Ian Geoffrey James, Preston (GB); Edmond Richard Ridge, Preston (GB); David John Simm, Preston (GB); Malcolm Grant Pigott, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/643,770

(22) PCT Filed: Sep. 12, 2018

(86) PCT No.: PCT/GB2018/000123
§ 371 (c)(1),
(2) Date: Mar. 2, 2020

(87) PCT Pub. No.: WO2019/048813
PCT Pub. Date: Mar. 14, 2019

(65) Prior Publication Data
US 2020/0219314 A1 Jul. 9, 2020

(30) Foreign Application Priority Data

Sep. 11, 2017 (EP) ..................... 17190445
Sep. 11, 2017 (GB) ..................... 1714573

(51) Int. Cl.
G06T 17/10 (2006.01)
G06T 7/62 (2017.01)
(Continued)

(52) U.S. Cl.
CPC .......... G06T 17/10 (2013.01); G06F 3/04815 (2013.01); G06T 7/62 (2017.01); G06T 19/006 (2013.01)

(58) Field of Classification Search
CPC ......... G06T 17/10; G06T 7/62; G06T 19/006; G06F 3/04815
(Continued)

(56) References Cited

U.S. PATENT DOCUMENTS 5,838,262 A 11/1998 Kershner et al.
7,212,148 B1 5/2007 Torres
(Continued)

FOREIGN PATENT DOCUMENTS

GB 2532465 A 5/2016
KR 101757884 B1 7/2017
WO 2019048812 A1 3/2019

OTHER PUBLICATIONS

Partial European Search Report for Application No. 17190445.1 dated Feb. 7, 2018, 14 pages.
(Continued)

Primary Examiner — Hai Tao Sun
(74) Attorney, Agent, or Firm — Maine Cernota & Rardin (57) ABSTRACT A display apparatus and method for displaying an operational area to an operative of a host platform, said operational area being defined within an external real-world environment relative to said host platform, the apparatus comprising a viewing device (12) configured to provide to said operative, in use, a three-dimensional view of said external real-world environment; a display generating device for creating images at the viewing device, a user input (33) configured to receive user input data (35) representative of a specified target or region in respect of which an operation is to be performed, and thereby defining an initial geometric volume for the operational area, said user input data including data representative of the location within said external real-world environment of said specified target or region and data representative of said operation to be performed in respect thereof; and a processor (32) con-
(Continued)

figured to: use said user input data to generate or obtain three-dimensional image data representative of an adjusted geometric volume based, at least, on said initial geometric volume and on said operation to be performed, and display one or more images depicting said adjusted geometric volume and created using said three-dimensional image data, on said display generating device, the apparatus being configured to project or blend said one or more images displayed on said display generating device into said view of said external real-world environment at the relative location therein of the specified target or region.

18 Claims, 5 Drawing Sheets

(51) Int. Cl.
    *G06F 3/0481*     (2013.01)
    *G06T 19/00*     (2011.01)

(58) Field of Classification Search
    USPC .......................................................... 345/420
    See application file for complete search history.

(56) References Cited

U.S. PATENT DOCUMENTS

| | | | |
|---|---|---|---|
| 10,382,746 B1* | 8/2019 | Shapiro | G06F 3/011 |
| 2003/0210228 A1 | 11/2003 | Ebersole et al. | |
| 2011/0106447 A1* | 5/2011 | Wise | G02B 27/01 701/431 |
| 2013/0176192 A1 | 7/2013 | Varga et al. | |
| 2014/0097291 A1 | 4/2014 | Aymeric et al. | |
| 2014/0152792 A1 | 6/2014 | Krueger | |
| 2014/0240313 A1 | 8/2014 | Varga | |
| 2014/0267398 A1 | 9/2014 | Beckwith et al. | |
| 2015/0054826 A1 | 2/2015 | Varga | |
| 2017/0039765 A1 | 2/2017 | Zhou et al. | |
| 2017/0148173 A1* | 5/2017 | Kosmecki | G06T 7/0012 |
| 2017/0169610 A1* | 6/2017 | King | H04N 7/157 |
| 2017/0316613 A1* | 11/2017 | Wright | G06T 19/006 |

OTHER PUBLICATIONS

Great Britain Search Report for Application No. 1714573.1 dated Jun. 5, 2018, 4 pages.
Great Britain Combined Search and Examination Report for Application No. 18114671.2 dated Mar. 6, 2019, 7 pages.
International Preliminary Report on Patentability for Application No. PCT/GB2018/000123 dated Mar. 17, 2020, 10 pages. European Patent Office. Geneva, Switzerland.
PCT Search Report for Application No. PCT/GB2018/000122 dated Nov. 20, 2018, 15 pages.
Great Britian Search Report for Application No. 1714571.5 dated Feb. 12, 2018, 3 pages.
Great Britian Combined Search and Examination Report for Application No. 1814678.7 dated Mar. 7, 2019, 5 pages.
Partial European Search Report for Application No. 17190441.0 dated Jan. 12, 2018, 18 pages.
International Preliminary Report on Patentability for Application No. PCT/GB2018/000122, dated Mar. 26, 2020, 12 pages.
Office Action for U.S. Appl. No. 16/643,765, dated Mar. 4, 2021, 26 Pages.
Final Office Action for U.S. Appl. No. 16/643,765 dated Jun. 16, 2021, 17 pages.
Advisory Office Action for U.S. Appl. No. 16/643,765 dated Aug. 19, 2021, 3 Pages.

* cited by examiner

APPARATUS AND METHOD FOR DEFINING AND INTERACTING WITH REGIONS OF AN OPERATIONAL AREA

RELATED APPLICATIONS

This application is a national phase application filed under 35 USC § 371 of PCT Application No. PCT/GB2018/000123 with an International filing date of Sep. 12, 2018 which claims priority of GB Patent Application 1714573.1 filed Sep. 11, 2017 and EP Patent Application 17190445.1 filed Sep. 11, 2017. Each of these applications is herein incorporated by reference in its entirety for all purposes.

FIELD OF THE INVENTION

This invention relates generally to an apparatus and method for displaying to a user a view of an operational area and for enabling the user to interact with a display of the operational area and, more particularly but not necessarily exclusively, to an apparatus and method for displaying an external operational area in respect of a host platform, such as the external airspace of an aircraft, to an operative, e.g. the pilot, of the platform, and for enabling the operative to define, and interact with, selected regions of the operational area via a display thereof.

BACKGROUND OF THE INVENTION

It is known, particularly in the field of military fighter aircraft and the like, to provide a helmet-mounted display (HMD), wherein a helmet is provided having a transparent visor and a display generating device (e.g. a screen or projector). These are arranged and configured to project or otherwise superimpose images onto the visor and thereby into the user's view of the real world (via transmitted/reflected light) to create an augmented reality environment. Thus, the wearer can view their real-world environment through the visor whilst also viewing additional images and/or data, received from other sources, displayed on the display generating device and projected onto the wearer's view of the real-world environment. As such, a processor is provided that receives real-time data from multiple sources, such as external image capture devices, speed sensors, weapon sensors, or target tracking systems, and generates two-dimensional image data representative of that data. The image data is projected into the wearer's view of the external real-world environment (viewed through the visor) in the form of representative two-dimensional images, thus effectively being superimposed on the wearer's real world field of view through the visor. This is known as an augmented reality display system.

It is also known to provide a display assembly having an opaque screen (which may be incorporated in a head-mounted display but may, alternatively, be provided in the form of a head-down or head-up display, for example), wherein a real-world environment is rendered to generate image data representative thereof and that image data is used to display on the screen, a virtual reality environment. In this case, additional data, received from other sources, may be blended into the virtual reality environment in the form of representative two-dimensional images.

A platform operative, e.g. a pilot of an aircraft, utilises the augmented reality and/or virtual reality display system to monitor the operational area in respect of the host platform. In both cases, any region of interest to the platform operative (e.g. the location of a threat zone around an enemy asset) can only be represented within the display as a two-dimensional plan view, at best, based on the location of a target and its area of influence at ground level. If a task or operation is to be performed in respect of a particular region or target within the operational area, the platform operative must form their situational awareness of the three-dimensional region therein, in respect of which the task or operation is defined, from a mental model based on information received during the pre-flight mission briefing, supplemented by information available from the above-mentioned two-dimensional plan views, physically displayed in the cockpit, from verbal and data communications received in real time, and from their view of the outside world looking out of the cockpit. Furthermore, they must assess the task or operation to be performed in relation to this complex data, received from multiple sources, to predict the likelihood of success of the operation under current conditions. This process is inevitably prone to inaccuracies and can lead to critical strategic errors.

SUMMARY OF THE INVENTION

Aspects of the present invention seek to address at least some of these issues and, in accordance with a first aspect of the present invention, there is provided a display apparatus for displaying an operational area to an operative of a host platform, said operational area being defined within an external real-world environment relative to said host platform, the apparatus comprising a viewing device configured to provide to said operative, in use, a three-dimensional view of said external real-world environment, a display generating device for creating images at the viewing device, a user input configured to receive user input data representative of a specified target or region in respect of which an operation is to be performed and thereby defining an initial geometric volume for the operational area, said user input data including data representative of the location within said external real-world environment of said specified target or region and data representative of said operation to be performed in respect thereof; and a processor configured to: use said user input data to generate or obtain three-dimensional image data representative of an adjusted geometric volume based, at least, on said initial geometric volume and on said operation to be performed, and display on said display generating device one or more images depicting said adjusted geometric volume and created using said three-dimensional image data, the apparatus being further configured to project or blend said one or more images within said view of said external real-world environment at the relative location therein of the specified target or region.

The processor may be configured to use said user input data to generate or obtain three-dimensional image data representative of the adjusted geometric volume based further on data representative of constraints within the real-world environment.

In an exemplary embodiment, the processor is configured to cause a three-dimensional model depicting said initial or adjusted geometric volume to be displayed on said viewing device and the apparatus is configured to project or blend said three-dimensional model within said view of said external real-world environment at the relative location therein of said specified target or region.

Thus, by generating a geometric volume representative of a three-dimensional region affected by an operation and then placing a visual representation (e.g. a three-dimensional model) of that geometric volume within the operative's view of the external real-world environment, at the relative location of (and oriented correctly in respect of) the specified target or region (i.e. in "real space"), the operative is able to immediately accurately visualise or "see", in real space, the region affected by the operation within the external real-world environment, such that the need to form and retain their situational awareness in the form of the above-mentioned mental model is obviated. In other words, the display apparatus defined above enhances the presentation of the complex data required to maintain accurate situational awareness.

The processor may comprise an input for receiving real-time target data representative of one or more targets, and their respective location(s), within said operational area. Such target data may be obtained using target detection and/or tracking technology on-board the host platform and/or on one or more other platforms within the external real-world environment. Target detection and tracking technologies are known, particularly in the field of military operations, and the present invention is not necessarily intended to be limited in this regard.

The processor may include, or be communicably coupled to, a data storage module, said data storage module having stored therein data representative of a plurality of operations or modes and data representative of a plurality of respective geometric volumes associated therewith. The user input may be configured to enable the operative to select an operation or mode from said plurality of operations or modes, and the processor may be configured, in response to selection of an operation or mode, to obtain the three dimensional image data representative of the geometric volume associated with the selected operation or mode.

The apparatus may further comprise one or more input devices configured to enable an operative to interact with the one or more images on the viewing device to move it/them to a desired location within their view of the external real-world environment and/or manually adjust the shape, size and/or orientation of the one or more images relative thereto. The input device(s) may comprise one or more of a plurality of controls, such as a conventional cursor with joystick, mouse or similar manual control device, touch controls via a touchscreen device, arm, hand or finger gestures, head movement, eye tracking technology, etc. A range of multi modal control means for manipulating image data on a touchscreen will be known to a person skilled in the art, and the present invention is not necessarily intended to be limited in this regard.

The processor may, in some exemplary embodiments of the present invention, be configured to generate and display said one or more images in respect of two or more respective operations simultaneously.

In one exemplary embodiment, the viewing device may be a transparent or translucent visor, such that the external real-world environment can be viewed through the visor, in use, and the display generating device may be arranged and configured such that images displayed thereon are projected into (i.e. superimposed on) the view of the external real-world environment. In this case, the apparatus may, for example, comprise a headset for placing over a user's eyes, in use, and including a visor and a display generating device (as described above), or the display generating device may be transparent or translucent and incorporated into the windscreen of a vehicle. In an alternative exemplary embodiment of the invention, the display generating device may be substantially opaque and the processor may include an input for receiving image data representative of an external real-world environment, and be configured to use said image data to generate and display on said display generating device, a three-dimensional virtual environment. The processor may thus beneficially be configured to blend the image data representative of the geometric volume(s) into said virtual environment on the display generating device. In this case, the display apparatus may comprise a head-mounted display, a head-up display, a head-down display, a display within a simulator, etc.

The display apparatus according to the invention finds particular (but not necessarily exclusive) utility in supporting a vehicle operative in assessing or predicting the likelihood of success of a specified operation at a specified location within the external real-world environment. Thus, the processor may be configured to use said user input data and data from other sources to determine a likelihood of success of a specified operation, and generate an output representative thereof. The output may comprise one of multiple predefined outputs, e.g. not possible, partially possible with limitations, and completely possible. The output may include data representative of conditions, parameters and characteristics governing the predicted outcome. The output may also include data representative of additional instructions/information to the operative in respect of said specified operation. The processor may be configured to generate and display on said display generating device, data representative of the real-time status of a specified operation. This may be achieved, for example, by the use of different colours in the displayed images to represent the respective status of the associated operation. The processor may be configured to receive or obtain terrain elevation data representative of said external real-world environment, use said terrain elevation data to calculate regions of intervisibility between the host platform/other platforms within the operational area and a specified target or region defined by the user input data, and determine said likelihood of success of the specified operation based on the calculated regions of intervisibility.

It will be appreciated that, since the processor is utilising real-time data to determine the above-mentioned likelihood of success of a specified operation, this can be updated in real time to take account of changes in circumstances while the operation is 'active', and the output updated accordingly. Thus, not only can the platform operative visualise the three-dimensional region of the external environment affected by a specified operation and receive an initial indication of its likelihood of success, as well as additional information that may influence/assist the success of the operation, this can be updated throughout the time that the operation is deemed 'active', thus enabling the operative to quickly plan and take any appropriate action.

In an exemplary embodiment, the three-dimensional view of the external real-world environment provided to the operative at the viewing device may be a scale view such that it appears smaller than the real-world (equivalent) environment.

In an exemplary embodiment, the apparatus may further comprise a network interface for interfacing with collaborating platforms, wherein the processor is configurable to divide the adjusted geometric volume between the platform and the collaborating platforms in order to perform the operation.

In an exemplary embodiment, the viewing device and display generating device may be configured to provide a stereoscopic representation of the user input data.

In an exemplary embodiment, the host platform may be an aircraft and an operation (or 'task') may comprise a countermeasure in respect of an enemy asset or radar scanning in respect of a specified region of the operational area to identify or track enemy assets. However, in accordance with some embodiments, the invention may be more generally applicable to other vehicle types in a wide variety of applications.

In an exemplary embodiment, the image(s) representing a geometric volume (e.g. three-dimensional airspace) affected by a specified operation may be a wire frame model, such that the visibility of the view of the external real-world environment within which it is placed is maximised. However, the present invention is not necessarily intended to be strictly limited in this regard. For example, sufficient visibility of the view of the external real-world environment could be achieved using solid, but translucent, models of the regions affected by respective operations. Indeed, any means of visually representing a three-dimensional volume in real space could be used.

In accordance with another aspect of the present invention, there is provided a method for displaying an operational area to an operative of a host platform, said operational area being defined within an external real-world environment relative to said host platform, the method comprising providing a viewing device configured to provide to said operative, in use, a three-dimensional view of said external real-world environment, providing a display generating device for creating images at the viewing device, receiving user input data representative of a specified target or region in respect of which an operation is to be performed, and thereby defining an initial geometric volume for the operational area, said user input data including data representative of the location within said external real-world environment of said specified target or region and data representative of said operation to be performed in respect thereof; using said user input data to generate or obtain three-dimensional image data representative of an adjusted geometric volume based, at least, on said initial geometric volume and on said operation to be performed; and displaying one or more images depicting said adjusted geometric volume and created using said three-dimensional image data, on said display generating device, and configuring the apparatus to project or blend said one or more images within said view of said external real-world environment at the relative location therein of the specified target or region.

BRIEF DESCRIPTION OF THE DRAWINGS

These and other aspects of the invention will be apparent from the following specific description, in which embodiments of the invention are described, by way of examples only, and with reference to the accompanying drawings, in which.

DETAILED DESCRIPTION

Figure 1:
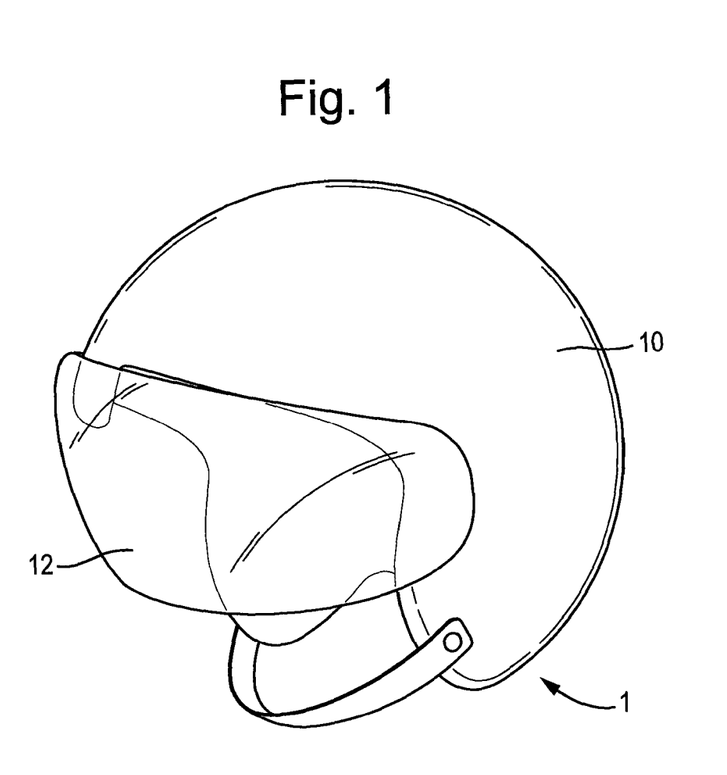
FIG. 1 is a helmet-mounted display of apparatus according to an exemplary embodiment of the present invention.

Referring to FIG. 1 of the drawings, a display apparatus according to an exemplary embodiment of the present invention comprises an integrated two-part helmet-mounted display (HMD) 1 comprising a protective helmet 10 configured, in use, to cover the crown, back and sides of a wearer's head, and a see-through (translucent or transparent) visor 12. A screen (e.g. an array of light emitting pixels such as OLED pixels) is provided in the helmet 10 and the visor 12 acts as a mirror which, together with other optical components, enables a wearer to view, within the real-world environment visible through the visor, the images displayed on the screen. The visor 12 extends between the side portions of the protective helmet 10 and is configured, in use, to cover a wearer's eyes such that they can see through the visor and also see any symbology or images displayed on the screen via transmitted/reflected light. In an exemplary embodiment, the screen provides a fully overlapped, 40-degree, binocular display. This type of helmet mounted display assembly is known in the field of military aircraft.

The display apparatus of the invention includes a processor (not shown in FIG. 1), which may be incorporated into the helmet mounted display assembly 1 but is more preferably located elsewhere in the aircraft, with a wireless interface being provided on the helmet itself and coupled to the screen to define a data link between the processor and the screen, thus avoiding the additional weight on the helmet that the processor would otherwise represent.

Weapon sensors on the host aircraft track enemy aircraft and missile (e.g. Surface-to-Air Missile [SAM]) information, and data from these sensors, as well as data from other platforms in the battle space and/or Head Quarters (HQ) can be fed to the processor. Furthermore, the helmet-mounted display may include a head tracker system, wherein targets, e.g. transmitters such as LEDs (not shown in FIG. 1), on the helmet 10 are communicably coupled to fixed sensors on the aircraft. The sensors track the transmitters on the helmet and generate representative signals such that the processor always 'knows' where the pilot is looking. Such target tracking and head tracking technologies are known in the art, and will not be described in any further detail herein.

It will be understood by a person skilled on the art that, in use, the wearer of the helmet-mounted display will be able to see through the visor 12 to obtain a view of the external (and internal) operational environment in whatever direction the wearer chooses to look. The processor, knowing the field of view of the visor (based on the position/altitude of the host platform and the user's relative or absolute head position/orientation) and the direction in which the wearer is looking, can determine the precise operational area visible to the wearer at any time.

Figure 2:
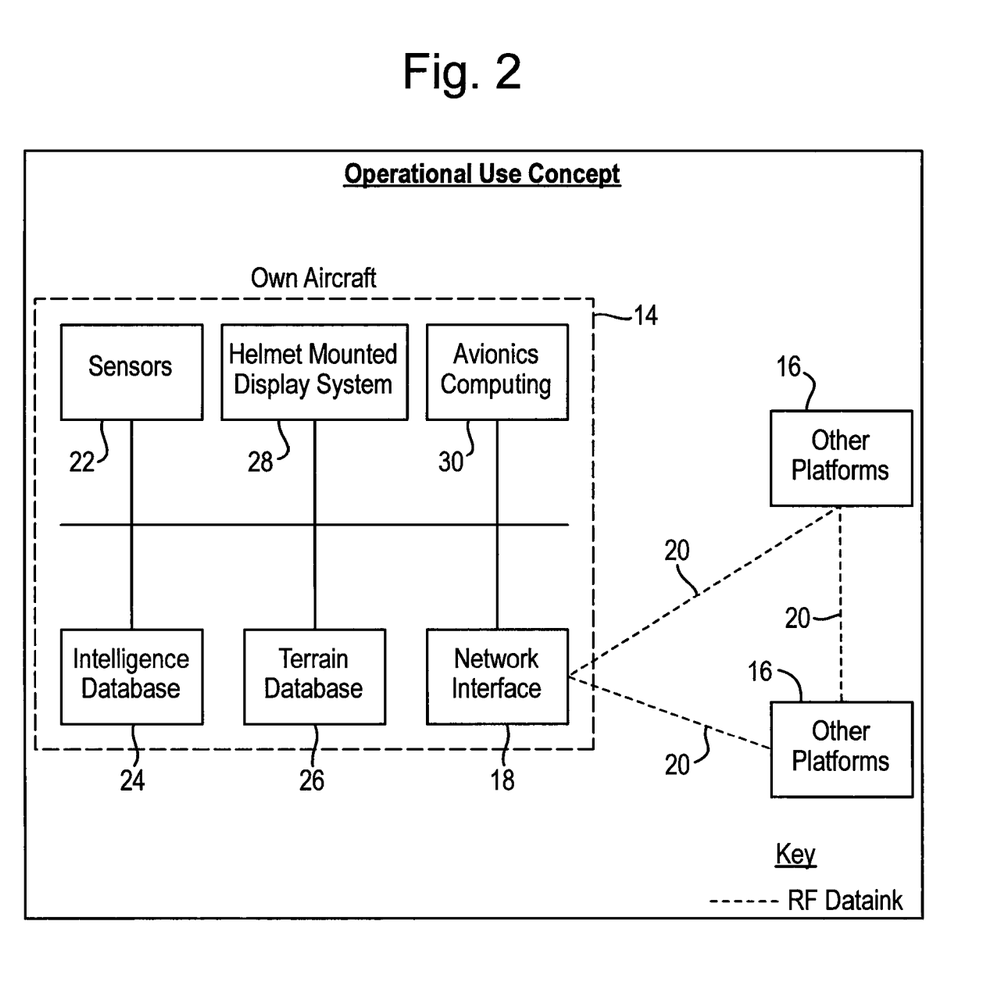
FIG. 2 is a schematic block diagram illustrating elements of an operational environment around a host platform.

Referring additionally to FIG. 2 of the drawings, there is provided a conceptual block diagram of an operational environment (internal and external) around an aircraft 14 (the "host" aircraft or platform). Other platforms operating in the same battle space are denoted by reference numeral 16. The other platforms 16 include radio frequency (RF) transmission means (not shown) and the host aircraft 14 includes a network interface 18 configured to receive data from the other platforms 16 via an associated RF data link 20.

As stated above, weapon sensors 22 are incorporated in the host aircraft 14, in conjunction with an intelligence database 24, to detect and track enemy missile information. A terrain database 26, provided in the host aircraft 14, stores terrain data representative of the external environment, and is configured to provide specific terrain elevation data to the processor (not shown in FIG. 2) included within the helmet-mounted display system 28, based on the external operational area visible to the wearer (determined using the above-mentioned head tracker system (not shown), knowledge of the field of view of the visor, position and altitude data in respects of the host aircraft 14, etc.).

Thus, it can be seen that, depending on the precise external operational area visible to the wearer of the helmet-mounted display assembly illustrated schematically in FIG. 1 of the drawings, the processor associated with the display apparatus can receive, in real time, terrain elevation data and data representative of the location and characteristic(s) of one or more enemy assets, e.g. Surface-to-Air Missiles in the area (from any or all of the intelligence database 24, other platforms 16 or HQ). For completeness, the computer system(s) controlling the aircraft's electronics systems is depicted generally as an avionics computing module 30.

Figure 3:
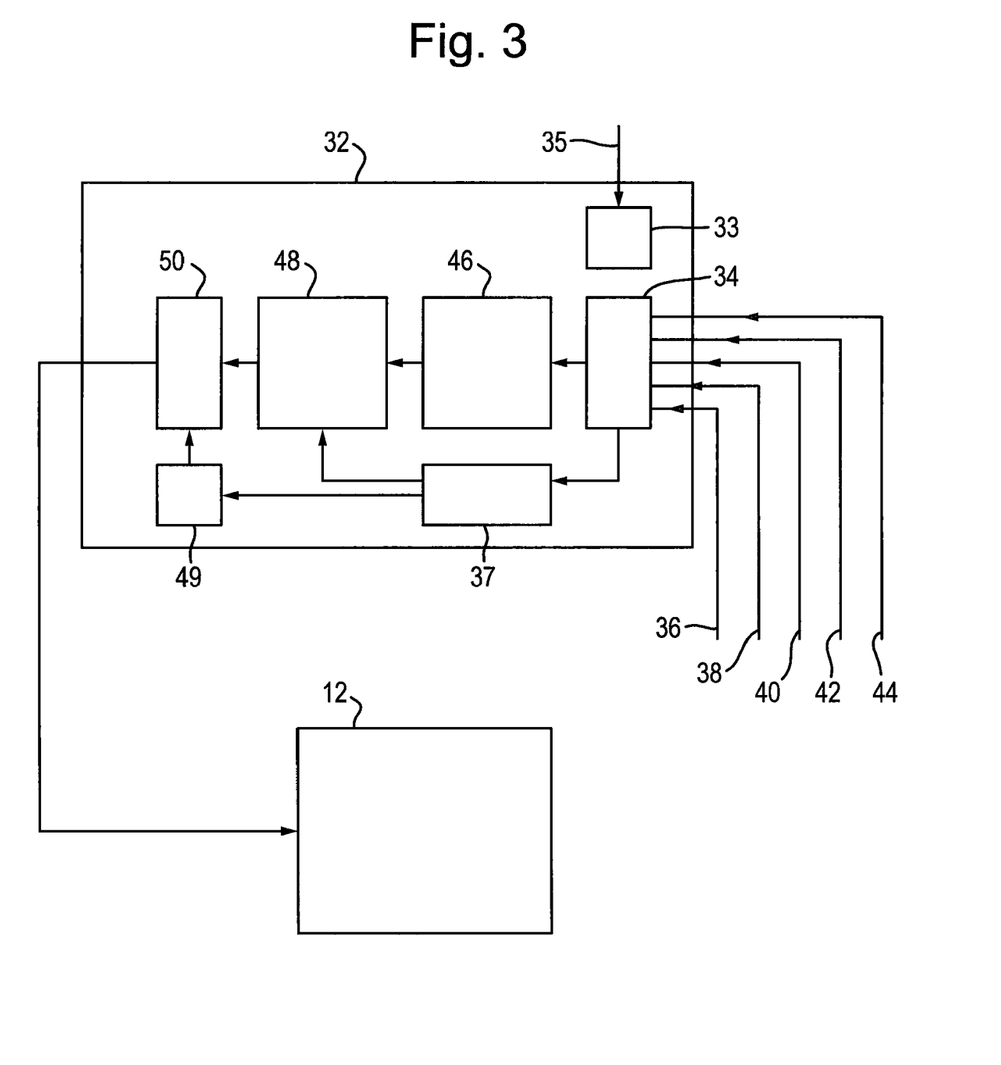
FIG. 3 is a schematic block diagram of a display apparatus according to an exemplary embodiment of the present invention, illustrating principal elements of a processor thereof.

Referring now to FIG. 3 of the drawings, a processor 32 of a display apparatus according to an exemplary embodiment of the present invention comprises a user interface 33 for receiving user input data 35 representative of a task to be performed and the location or target within their operational area in respect of which a task/operation is to be performed. The task/operation may be defined within a volume of airspace or an area on the surface of the land (or sea, in other exemplary embodiments, or even under the surface of the sea) using assets on the host platform or those on cooperating manned or unmanned vehicles which may be airborne, land or sea (surface or sub-surface) vehicles. In the field of military aircraft, for example, the operation to be performed may be a search using a variety of sensors in order to detect, track/identify a range of object types or it could require action to be taken against identified (target) objects, for example to jam their sensors or to destroy them.

The processor further comprises an input interface 34 configured to receive real-time data from various sources. In the illustrated block diagram, the following inputs are depicted schematically:

36: input data from the head tracker system for providing data as to where the pilot is looking and also to provide an indication that they have moved their head (which may trigger an updated calculation); this data will also have been provided to the above-mentioned terrain database, which is configured to extract terrain elevation data relating to the pilot's current field of view. In addition, of course, data representative of the position and altitude of the host platform will be required to determine exactly where in the outside world the pilot is looking.

38: input data from the terrain database comprising the terrain elevation data corresponding to the pilot's current field of view.

40: input data from the on-board target detection and tracking systems, comprising data representative of threats and their ground level locations; this data may also include key characteristics relating to the specific threat, although this information may, additionally or alternatively, come from elsewhere (e.g. HQ, pre-mission briefing, other platforms).

42: input(s) from other platforms and/or Head Quarters (HQ), via the above-mentioned network interface 18. These inputs may comprise data representative of threats and their ground level locations (and, optionally, key characteristics related thereto).

44: optionally, inputs may be received from other sources and systems, comprising data that may be used in determining a likelihood of success of a task or operation defined by the pilot. This calculation also requires knowledge of the position and altitude of the host platform.

The processor 32 further comprises some means for selecting a "mode" of operation, depending on the nature of the task/operation defined by the user. It is the selected "mode" that determines the shape of the geometric volume to be generated and displayed. Mode selection may be performed by the user (via the user input data 35), or it may be performed automatically by the processor 32 in accordance with the task/operation defined by the user. Thus, the processor 32 comprises (or is communicably coupled to) a database 46 and is configured to process the input data from the user input 33 and select or obtain from the database 46, a geometric volume to represent the task/operation defined (according to the mode of operation). The user may interact with the geometric volume displayed on the screen (e.g. to move it or change its orientation) using a range of multi modal controls, which could include (but are not necessarily limited to:

A conventional cursor with joystick, mouse or similar controls;

Touch controls via a conventional touchscreen device or by the application, of devices to sense the position of the pilot's hand and fingers where virtual displays or control panels are represented within arm's reach of the pilot;

Arm, hand and/or finger gestures using devices to sense the position of the pilot's hands and fingers (possibly supported by haptic feedback devices);

Tracking of head position and orientation to interact with objects on an augmented or virtual reality display;

Tracking of eye gaze position using sensors mounted in the cockpit or pilot's helmet.

The appropriate form of interaction may depend on the task to be performed, the operational environment and/or the pilot's personal preferences.

The processor 32 is further configured to process (in calculation module 37) the input data received at the input interface 34 and thereby calculate, based on the location of the specified task/operation, its characteristics (i.e. type of operation to be performed, characteristics of the assets available to perform the operation) and real-time data representative of conditions at the specified location, including terrain elevation data, to calculate regions of intervisibility and other factors affecting the volume of airspace defined in respect of the specified operation. For example, in respect of a surface search task for a seaborne vessel, the search space will be constrained by the coastline, in this or other applications, a search task may be constrained by political borders, controlled airspace volumes or operational boundaries.

Starting from the initial geometric volume defined by the nature of the specified task/operation and the terrain elevation (and other) data associated with the specific location at which the task/operation is defined, the processor calculates an adjusted geometric volume representative of the available airspace for performing the specified task/operation at a specified location (or in respect of a specified target).

Data representative of the above-mentioned geometric volume is then passed to an image data generation module 48, which generates image data configured to cause the geometric volume to be output (via interface 50) and displayed, for example as a wireframe model, on the screen 12 of the helmet-mounted display such that it is scaled and superimposed on the wearer's view of the outside world at the precise location therein of the specified SAM and sized and oriented to match the real-world situation. Thus, the pilot can immediately "see" a three-dimensional representation of the operable area represented by the specified task/operation in real time and space.

With reference to FIGS. 4a, 4b, 4c, and 5 the pilot may be presented with a 3D environment 100. This particular environment 100 is entirely composed of symbology and imagery, which is to say it is entirely computer-generated (albeit based on real world data), then displayed on the screen and then projected onto a visor or windscreen so as to appear in the pilot's field of view. By being entirely computer-generated, the presented environment 100 can be scaled and relocated within the pilots field of view for convenience. An alternative arrangement may provide a 3D environment for superimposition onto the real world view through the visor or windscreen.

Figure 4A:
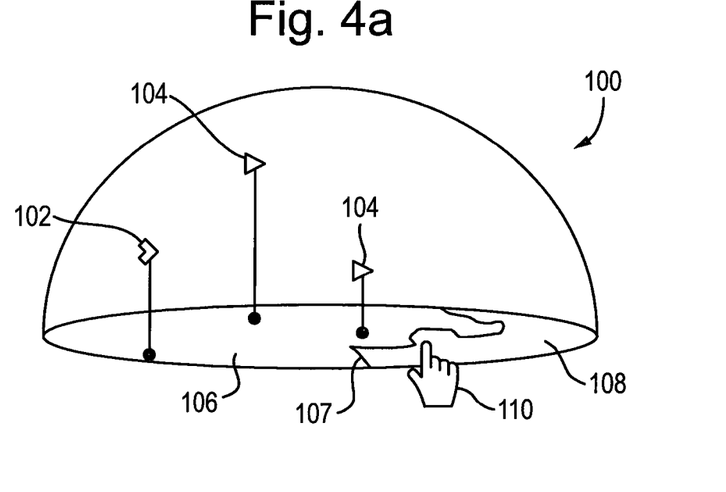
FIGS. 4a, 4b and 4c show a three-dimensional representation of an operational area, which may be presented to an operator to facilitate area selections and task allocation.

In the environment 100, there is displayed the pilot's own aircraft track 102, a first and second collaborative aircraft track 104, and some basic terrain information illustrating a first ground map region 106 distinguished from a second ground map region 108 by a border 107. In this particular example, the region 106 is the sea, the region 108 is land and the border 107 is a coastline.

Figure 5:
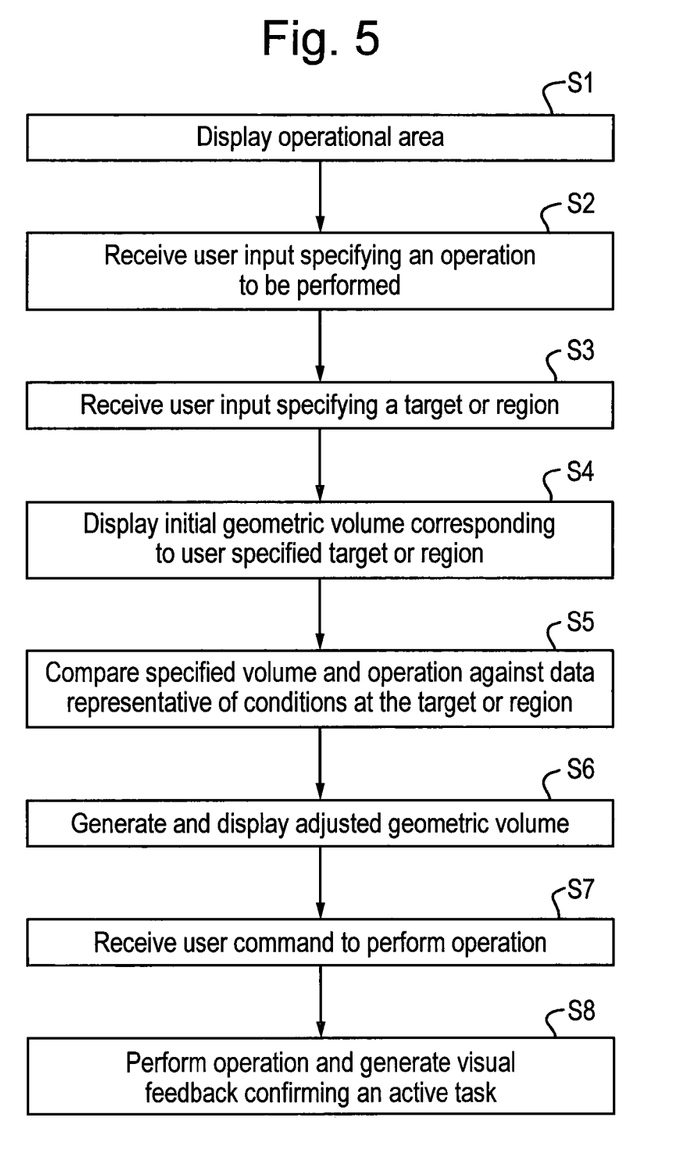
FIG. 5 is a flow diagram setting out a process for setting up a geometric volume for task performance.

Thus is displayed an operation area in accordance with step S1 of the process of FIG. 5.

With the environment displayed, the pilot selects via an input device (for example a virtual touchscreen and/or HOTAS input) a particular operation to be performed. Specifically in this example, the pilot specifies a 'search area for ships' task to be carried out by the collaborative aircraft 104.

Thus is specified an operation to be performed in accordance with step S2 of FIG. 5.

Figure 4B:
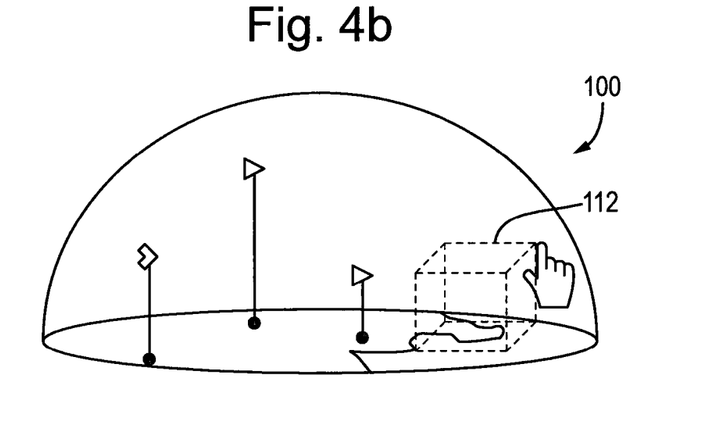

Having selected to perform the search task, the processor 32, through reference to the database 46 determines a suitable initial geometric volume. In this example that is a cuboid geometric volume. Accordingly, as the pilot inputs a location and region, a corresponding cuboid form 112 is displayed 112. The pilot may specify the location and region in a number of different ways, for example as shown here by moving a pointing hand 110 across the environment to comply with a predetermined gesture recognition regime.

Thus the pilot can specify a target region according to step S3 and display an initial geometric volume according to step S4.

Figure 4C:
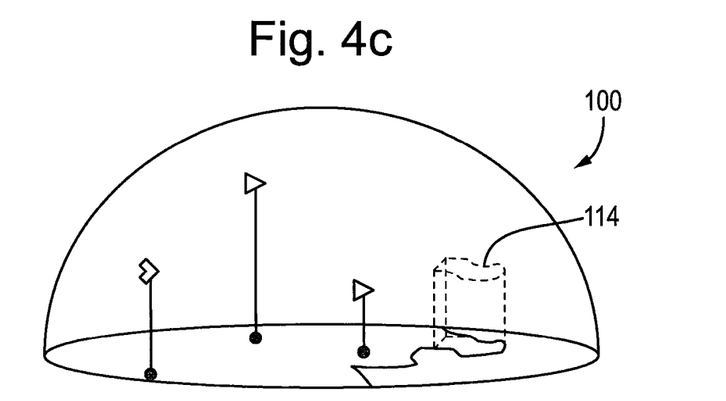

Having established and displayed the initial geometric volume 112 (or alternatively as soon as the initial geometric volume is established) the processor 32 compares this with other factors such as the terrain data 38 and task data. As a result of this comparison, in this example the processor 32 determines that areas of the initial geometric volume 112 which correspond to the land region are not of interest for the search. This having been determined, an updated geometric volume 114, in this example a truncated version of the initial volume 112) is generated and displayed. (Where the task may be performed by a group of platforms, such as collaborators 104, the processor may further compartmentalise the updated/adjusted geometric volume in to areas corresponding to platform-specific workloads—for example a volume for search by a first collaborator, and a volume for search by a further collaborator).

Thus the initially specified volume and task is compared with conditions in the region according to step S5 of FIG. 5, and the adjusted geometric volume is displayed according to step S6 of FIG. 5.

The user can then issue a command by way of an input device to execute the search, according to step S7.

By displaying to the user not only the initial volume, but also the adjusted volume, there is provided a user experience where the pilot can see the steps taken by the processor 32 and thereby both appreciate the final output (e.g. have more trust in it) and infer certain properties of the environment/target without over-exposure data which may be less relevant.

In alternative embodiments, the initial geometric volume may be defined but not displayed, the first volume being presented to the pilot being the adjusted volume. Such an arrangement can tend to minimise symbology presented to the pilot. Referring back to FIG. 3, the processor 32 further comprises a prediction module 49 for receiving data representative of the task/operation to be performed, the assets available/specified to perform it, the location at which it is to be performed and (where applicable) the target in respect of which it is to be performed, and calculates a likelihood of success given current parameters and conditions. Of course, it is to be understood that the prediction module 49 may not necessarily be incorporated within the apparatus of the present invention. Instead, the prediction module could be incorporated in the on-board computer or elsewhere, and the processor 32 may be communicably coupled to the output thereof.

Data representative of the likelihood of success, thus calculated, may be output to the screen as one of a plurality of messages, e.g. 'not possible', partially possible with identified limitations, and 'completely possible'. Supporting information can also be provided, such as the specific assets to be assigned to the task or why some of the task objectives cannot be achieved, possibly with recommendations to assign more or different assets to perform the task.

When the task is initiated by the pilot, visual feedback may be generated (and displayed) to show that it is an active task (step S8 of FIG. 5). As the task progresses further, visual feedback may be provided to indicate this, for example, by rendering the searched areas or volumes using different colours from currently unsearched regions. In the case, of a scanning task, as objects are detected or identified during the scan, their presence or status can be identified and displayed in the form of icons, for example, with which the pilot can interact on the screen using any suitable input device, such as one or more of those defined above.

Thus, in general, an exemplary embodiment of the invention provides an apparatus and method for representing, on a display, a volume (or surface) within which a task or operation is to be performed. Once the operation has been defined, a geometric model is selected (according to the nature of the operation) and placed at a desired location/orientation within a real-world representation of an operative's external environment. This enables the operative to visualise or "see" at a glance the dimensional parameters of the region affected by the operation and provides immediate situational awareness.

Intelligent use of appropriate contextual data related to the specific operation is used to support the definition of the displayed geometric model. Thus, if there are environmental or other factors affecting the ability of the operation to be performed within the airspace defined by the original geometric model, the displayed geometric model can be adjusted accordingly, thereby further enhancing the operative's situational awareness.

Following the definition of the area or volume within which the operation is required, the operative can issue the operation to an on-board computer system along with any additional information relating to the operation, such as the time in which it must be completed, the priority that should be assigned to it and other related performance parameters. The computer system assesses the requirements of the operation and interacts with other cooperating assets via RF data links. All cooperating assets could identify how they would contribute to the specified operation.

The platform operative may then be provided with feedback (e.g. on the screen) from the computer to identify whether the operation is/was: not possible, partially possible with identified limitations, or completely possible, for example. Supporting information may also be provided, such as the specific assets to be assigned to the operation or why some of the operation objectives cannot be achieved, possibly with recommendations to assign more or different assets to perform the operation.

When the operation is initiated by the operative, visual feedback may be provided on any appropriate display to show that it is an active operation, and as the operation progresses, further visual feedback may indicate this, for example, by rendering searched areas or volumes using different colours from currently unsearched regions. As objects of interest are detected or identified as required by the selected operation, their presence or status may be provided on any appropriate selected display and the operative may be able to interact with icons or images representative thereof using any input means appropriate to the particular display surface, virtual or real.

Whilst the invention has been described above, in relation to a head-mounted display assembly, particularly for use in military fighter aircraft applications, it will be apparent to a person skilled in the art, from the foregoing description, that modifications and variations could be made to the described embodiments, without departing from the scope of the invention as defined by the appended claims.

For the purposes of the following non-exhaustive list of alternative embodiments, it is to be understood that the term "augmented reality" is intended to refer to a system in which image data displayed on a see-through screen such that it is superimposed on a user's real-world view of their environment, whereas the term "virtual reality" is intended to refer to a system where a virtual environment is depicted on an opaque screen (for example, a rendered image of the external or internal environment in which an operative and/or vehicle is located) and additional (information) image data is blended into the virtual environment. As previously stated, some exemplary embodiments of the invention may be more generally applicable to operators of other vehicle types and in a wide variety of applications.

In particular, the display apparatus could comprise any of the following provisions for combining a real-world view (either provided directly or via a live video feed) with computer generated imagery (CGI):

A conventional physical television-like display presenting a number of different views of the surface or area affected by a specified operation;

A virtual representation of a "flat" display rendered in a colour stereoscopic head mounted display system (i.e. the representation appears flat but is rendered to appear at any desired location in and around the cockpit, for example);

A full 3D stereoscopic enhanced virtual representation of the same information (i.e. one in which the image would appear to be a three dimensional scale model of the world rendered in or around the cockpit, for example);

A full 3D stereoscopic enhanced virtual representation of the same information aligned with the real world area or volume as viewed by the pilot (and as described above).

In all cases, aspects of the present invention provide an apparatus and method that use data from the host platform combined with data from other platforms within the operational area to provide intuitive information and display systems to a platform operative to support and inform task planning and provide cooperative feedback.

Where stereoscopic representations are generated, associated provisions with respect of the screen are made. For example, the screen may comprise a first and second sub-screen, each of which creates an image which acts with the other to create the stereoscopic effect.

Embodiments described above disclose the use of a screen as the display generating device, configured for relaying light to the viewing device (e.g. visor) and thereby creating human-viewable images. However, as an alternative to a screen, other devices for relaying light to the viewing device and creating images may be provided. In particular, projector technologies and/or optical waveguide technologies could be utilised.

What is claimed is:

1. A display apparatus configured for displaying an operational area to an operative of a host platform, said operational area being defined within an external real-world environment relative to said host platform, the apparatus comprising:

a viewing device configured to provide to said operative, in use, a three-dimensional view of said external real-world environment;

a display generating device for creating images at the viewing device; and a data input configured to receive input data representative of a specified external, real world target region within said external real-world environment upon which an external, real world operation is to be performed, and thereby defining an initial external, real world geometric volume for the operational area, said input data including:

data representative of a location within said external real-world environment of said specified target region within said external real-world environment, and data representative of said operation to be performed upon said specified external, real world target region within said external real-world environment; and a processor configured to:
use said user input data to determine an adjusted external, real world geometric volume based, at least, on said initial external, real world geometric volume and on said external, real-world operation to be performed;

generate or obtain three-dimensional image data representative of said adjusted external, real world geometric volume;

display one or more images depicting said adjusted external, real world geometric volume and created using said three-dimensional image data, on said display generating device; and use said user input data and data from other sources to determine a likelihood of success of the external, real world operation that is to be performed upon the external, real world target area, and generate an output representative thereof, wherein the output is able to indicate a partial possibility of success;

the apparatus being configured to project or blend said one or more images within said view of said external real-world environment at the relative location therein of the specified target region.

2. The display apparatus according to claim 1 wherein the processor is configured to use said user input data to generate or obtain three-dimensional image data representative of the adjusted geometric volume based further on data representative of constraints within the real-world environment.

3. The display apparatus according to claim 1, wherein the processor is configured to cause a three-dimensional model depicting said initial or adjusted geometric volume to be displayed on said viewing device and the apparatus is configured to project or blend said three-dimensional model within said view of said external real-world environment at the relative location therein of said specified target region.

4. The display apparatus according to claim 1, wherein the processor comprises an input for receiving real-time target data representative of one or more targets, and their respective location(s), within said operational area.

5. The display apparatus according to claim 1, wherein the processor includes, or is communicably coupled to, a data storage module, said data storage module having stored therein data representative of a plurality of operations or modes and data representative of a plurality of respective geometric volumes associated therewith.

6. The display apparatus according to claim 5, wherein the user input is configured to enable the operative to select an operation or mode from said plurality of operations or modes, and the processor is configured, in response to selection of an operation or mode, to obtain the three dimensional image data representative of the geometric volume associated with the selected operation or mode.

7. The display apparatus according to claim 1, comprising one or more input devices configured to enable an operative to interact with the one or more images on the viewing device to move it/them to a desired location within their view of the external real-world environment and/or manually adjust the shape, size and/or orientation of the one or more images relative thereto.

8. The display apparatus according to claim 1, wherein the processor is configured to generate and display said one or more images in respect of two or more respective operations simultaneously.

9. The display apparatus according to claim 1, wherein the output comprises one of multiple predefined outputs.

10. The display apparatus according to claim 9, wherein the output includes data representative of conditions, parameters and characteristics governing the predicted outcome; and/or data representative of additional instructions/information to the operative in respect of said specified operation.

11. The display apparatus according to claim 1, wherein the processor is configured to generate and display on said display generating device, data representative of the real-time status of a specified operation.

12. The display apparatus according to claim 1, wherein the processor is configured to receive or obtain terrain elevation data representative of said external real-world environment, use said terrain elevation data to calculate regions of intervisibility between the host platform/other platforms within the operational area and a specified target region defined by the user input data, and determine said likelihood of success of the specified operation based on the calculated regions of intervisibility.

13. The display apparatus according to claim 1, wherein the three-dimensional view of the external real-world environment provided to the operative at the viewing device is a scale view such that it appears smaller than the real-world environment.

14. The display apparatus according to claim 1, further comprising a network interface for interfacing with collaborating platforms, wherein the processor is configurable to divide the adjusted geometric volume between the platform and the collaborating platforms in order to perform the operation.

15. The display apparatus according to claim 1, wherein the viewing device and display generating device are configured to provide a stereoscopic representation of the user input data.

16. The display apparatus of claim 1 wherein said input data further includes interaction data representative of changes to the boundaries of the initial geometric volume made interactively by the user, thereby defining a user preferred geometric volume, and wherein the processor is configured to use said user input data to determine an adjusted geometric volume based, at least, on said user preferred geometric volume and on said external, real-world operation to be performed.

17. The display apparatus of claim 9, wherein the multiple predefined outputs comprise an output of not possible, an output of partially possible with limitations, and an output of completely possible.

18. A method of displaying an operational area to an operative of a host platform, said operational area being defined within an external real-world environment relative to said host platform, the method comprising:

providing a viewing device configured to provide to said operative, in use, a three-dimensional view of said external real-world environment;

providing a display generating device for creating images at the viewing device;

receiving user input data representative of a specified target region within said external real world environment in respect of which an operation is to be performed, and thereby defining an initial geometric volume for the operational area, said user input data including data representative of a location within said external real-world environment of said specified target region within said external real world environment, and data representative of said operation to be performed within said specified target region within said external real-world environment;

using said user input data to calculate an adjusted geometric volume based, at least, on said initial geometric volume and on said operation to be performed;

generating or obtaining three-dimensional image data representative of said adjusted geometric volume;

displaying on said display generating device one or more images depicting said adjusted geometric volume, said one or more images being created using said three-dimensional image data;

using said user input data and data from other sources to determine a likelihood of success of the external, real world operation that is to be performed upon the external, real world target area, and generating an output representative thereof, wherein the output is able to indicate a partial possibility of success; and blending or projecting said one or more images displayed on said viewing device into said view of said external real-world environment at the relative location therein of the specified target region.

* * * * *